(12) United States Patent
Spracher

(10) Patent No.: US 6,227,185 B1
(45) Date of Patent: May 8, 2001

(54) AIR INTAKE CONDUIT FUEL METERING DEVICE

(76) Inventor: Edward J. Spracher, P.O. Box 7994, Nikiski, AK (US) 99653

( * ) Notice: Subject to any disclaimer, the term of this patent is extended or adjusted under 35 U.S.C. 154(b) by 0 days.

(21) Appl. No.: 09/260,396

(22) Filed: Mar. 1, 1999

(51) Int. Cl.⁷ .................................................. F02M 29/06
(52) U.S. Cl. ........................ 123/590; 123/592; 261/79.1
(58) Field of Search ................................. 123/590, 592; 261/79.1, DIG. 12

(56) References Cited

U.S. PATENT DOCUMENTS

| | | | |
|---|---|---|---|
| 1,857,070 | * | 5/1932 | Thomas .............................. 261/79.1 |
| 2,746,802 | * | 5/1956 | Feis ..................................... 299/140 |
| 3,671,208 | * | 6/1972 | Medsker ............................. 123/590 |
| 3,682,390 | * | 8/1972 | Chershire et al. .................. 261/79.2 |
| 4,209,472 | * | 6/1980 | Child et al. ......................... 123/590 |
| 4,250,856 | * | 2/1981 | Abbey .......................... 261/DIG. 12 |
| 4,276,867 | * | 7/1981 | Metzenthin ........................ 123/590 |
| 5,113,838 | * | 5/1992 | Kim ..................................... 123/590 |
| 5,685,281 | * | 11/1997 | Li ........................................ 123/590 |
| 5,947,081 | * | 9/1999 | Kim ..................................... 123/590 |

* cited by examiner

*Primary Examiner*—Erick Solis
(74) *Attorney, Agent, or Firm*—Joseph W. Holland

(57) ABSTRACT

An improved air intake conduit for a fuel metering device including an air inlet passage, the air intake conduit including a primary duct which is configured to be attachable to the fuel metering device permitting fluid communication of air through the primary duct to the fuel metering device. An air flow directing vane extends across the passage of the primary duct, typically at the upstream end of the primary duct, and is configured and oriented in relation to the air flow to impart a controlled and substantially inclined circular air flow within the air inlet passage. One embodiment of the invention includes a plurality of air flow directing vanes extending axially from the sides of the primary duct towards the center region of the air inlet passage. A secondary duct, including a venturi, is attached at ends of the plurality of air flow directing vanes. Each air flow directing vane may be configured as an asymmetrical airfoil including a leading edge and trailing edge.

14 Claims, 3 Drawing Sheets

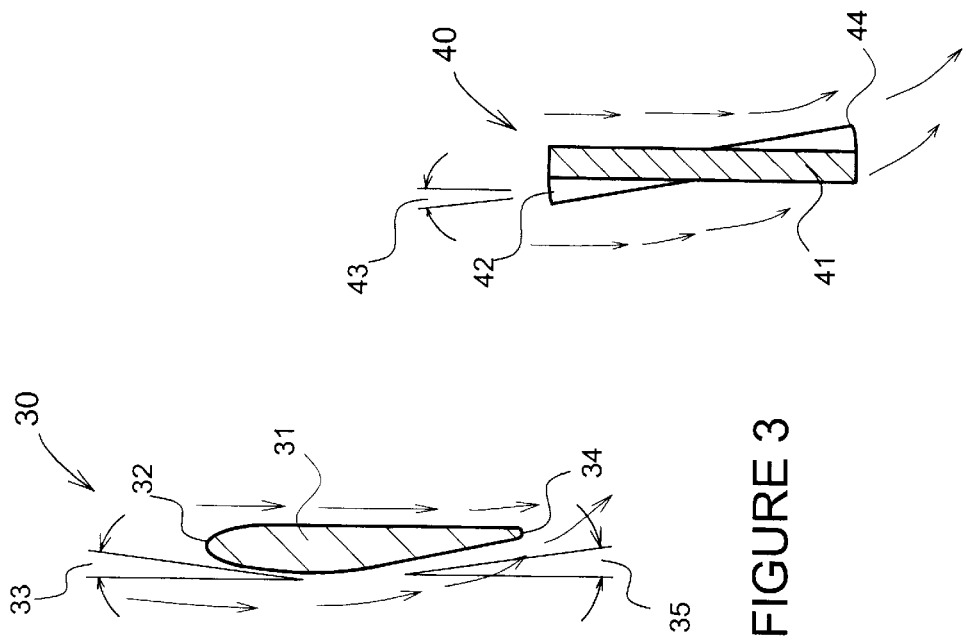
FIGURE 4
FIGURE 3
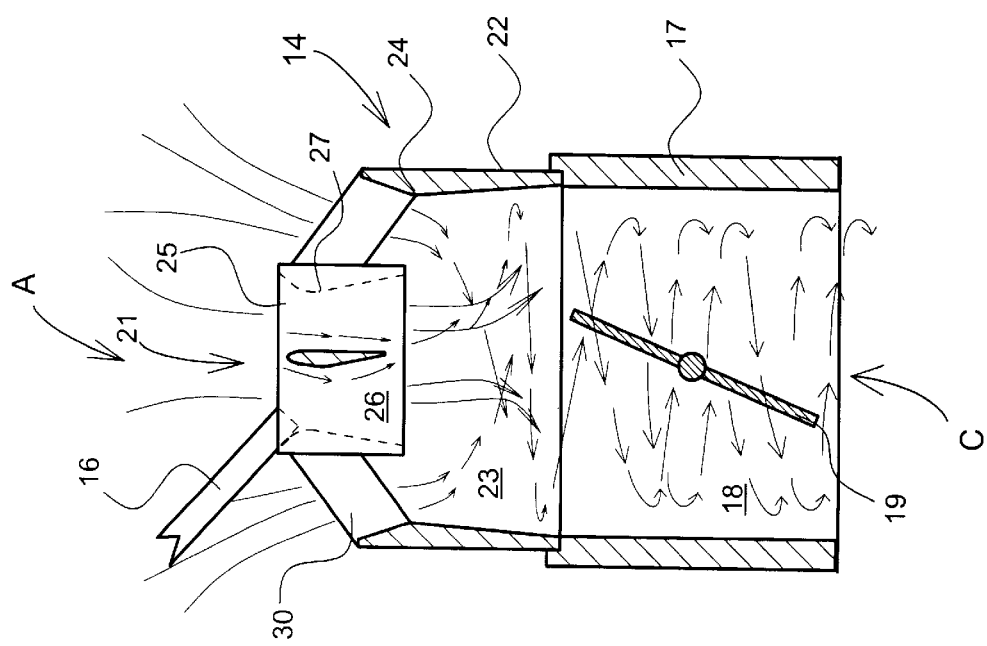
FIGURE 2

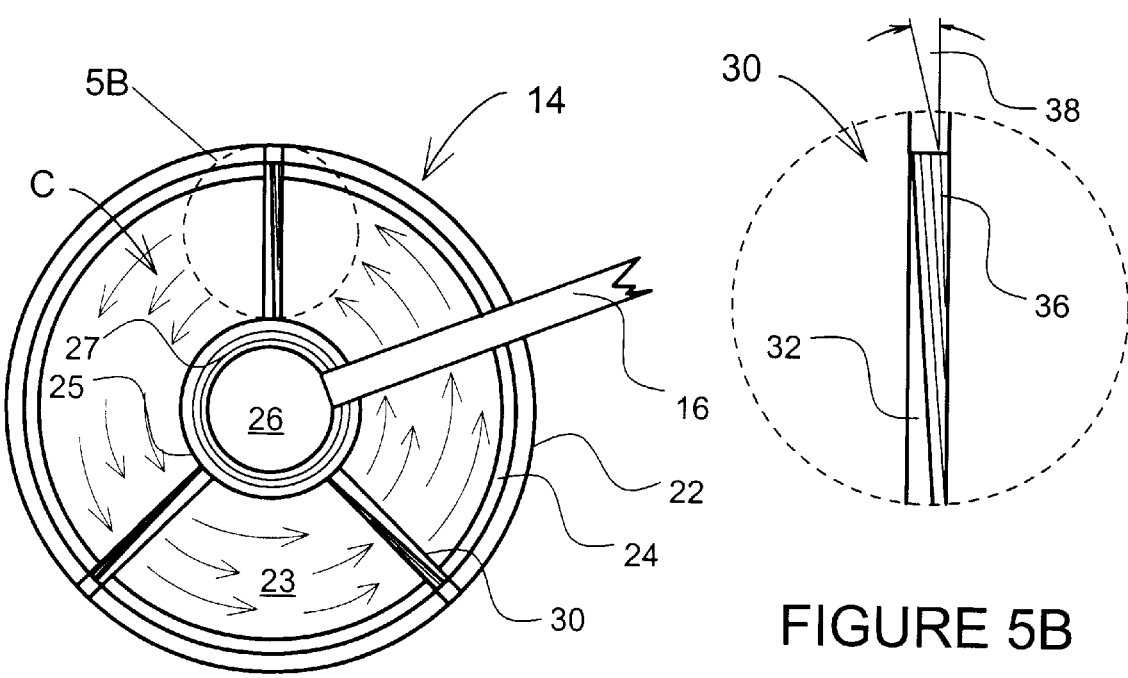
FIGURE 5A
FIGURE 5B
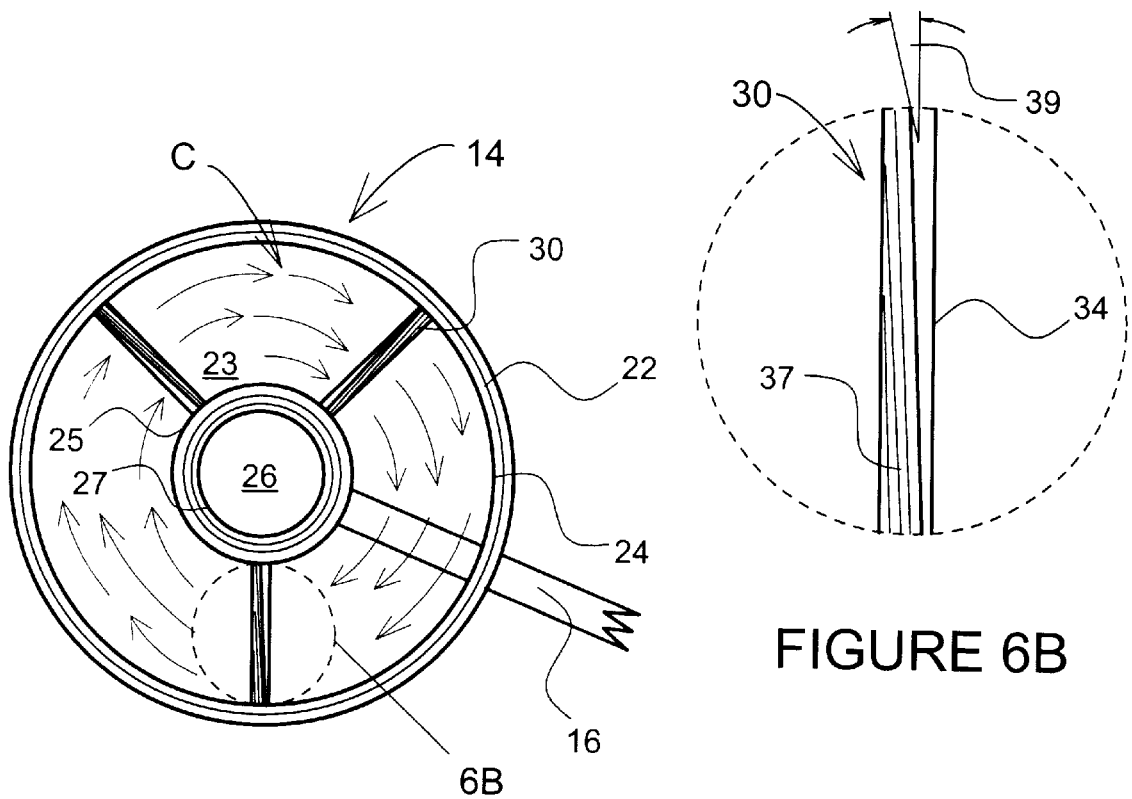
FIGURE 6A
FIGURE 6B

AIR INTAKE CONDUIT FUEL METERING DEVICE

BACKGROUND OF THE INVENTION

1. Technical Field

The present invention relates generally to atomization and mixture of liquid fuels with air and more particularly to an improved intake for a venturi and method for combining liquid fuels with air.

2. Background

A variety of devices are employed as fuel metering devices for internal combustion engines. Most often, fuel metering devices include an air intake, a fuel supply and a means for effecting the proper fuel to air mixture for combustion.

A carburetor supplies a liquid fuel, commonly gasoline, and an air mixture to an internal combustion engine in a manner which is most often variable and metered. The process of carburetion employs a negative pressure which is provided by the pistons which draws air through the intake valves and the attached carburetor. A carburetor typically includes a venturi which is employed in the liquid fuel and air mixture process. Air is drawn through an intake of the carburetor past a venturi section, through a throttle valve to the engine for combustion. As air is drawn past the venturi, the velocity of the air increases and the pressure decreases. Fuel is introduced into the carburetor, typically just above the venturi, for atomization in a generally laminar and accelerating flow of air through the intake and venturi. The venturi creates a region of lower pressure providing an advantageous site for atomization of liquid fuel into the passing air. The liquid fuel to be atomized is to drawn to the tip of a tube or other means for dispensing the liquid fuel, which feeds fuel above the venturi. The air stream which flows across the tip of the tube or other dispensing means draws the liquid from the dispensing means spreading it as a film along the walls of the venturi, the air flow eventually lifting away the liquid fuel in the form of atomized droplets.

An air intake may be configured including a primary duct having a secondary duct including a venturi positioned within the passage of the primary duct. The secondary duct including a venturi may be supported and positioned relative to the primary duct by support members.

In U.S. Pat. No. 2,746,802 to Feis, entitled Atomizer for Liquids, a secondary duct including a venturi is shown disposed and supported within a primary duct or venturi. In this case, a secondary duct including a venturi is supported by a fuel line or fuel lines which extend into the interior of the primary duct attaching to and passing through the side wall of the secondary duct. The patent to Feis also teaches the use of aerodynamically shaped structural components placed within an air intake passage for limiting turbulence and increasing laminar flow. In particular, Feis teaches the use of a symmetrically shaped airfoil section or duct through which a fuel supply line passes. Configuring structural components which are placed within an air intake passage to include streamlined or airfoil cross sectional configurations, has been employed to reduce the tendency for s disturbed air flow and a turbulent wake at the downstream edge of structural components that extend within an air flow. In such applications it is generally recognized that paralleling the flow of air and atomized fuel mixture is considered advantageous to the consistency of the results obtained in combustion.

It is also generally recognized that air flow beyond the venturi becomes increasingly turbulent, particularly as the air flow encounters the throttle valve. Depending upon engine load, the throttle valve may be positioned at any angle between zero degrees, (0°), (closed), and ninety degrees, (90°), (open). It is generally recognized that air flowing through an inlet upstream from the throttle valve must divide in order to flow past a partially open throttle valve. This phenomenon results in lateral air movement within the air inlet to provide for a division of the air stream upstream from the throttle valve. It is also recognized that liquid fuel that has not fully atomized has a tendency to localize towards a center portion of the intake flow ultimately being affected by the throttle valve. It is also generally recognized that the reaction of the air flow relative to the throttle valve results in less than optimal fuel distribution downstream from the throttle valve.

What is needed is a device that provides a controlled and even flow of air through the air intake of a fuel metering device such as a carburetor.

What is also needed is a device that provides for a controlled, even and substantially inclined circular or cyclonic flow of air through the air intake of a fuel metering device such as a carburetor. Such a device should provide a more consistent and even mixture of air to atomized fuel and should, in addition, diminish the tendency for increased turbulence, particularly as the air flow encounters the throttle valve.

Additionally, what is needed is a device that provides for a controlled and even flow of air through the air intake of a fuel metering device such as a carburetor thereby optimizing atomization and diminishing the presence of liquid fuel at or near the center portion of the intake flow.

It would similarly be of advantage to provide an air intake conduit that permits an engine to run cooler with increased power output and with the fuel to air mixture ratio leaner than that which is typically required. In addition, it would similarly be of advantage to provide an air intake conduit that permits an engine to operate at increased r.p.m. with more consistent exhaust gas temperatures across the various cylinders of the engine than is currently achievable.

SUMMARY OF THE INVENTION

Accordingly, these and other objectives are achieved by an air intake conduit for a fuel metering device, for instance a carburetor, the air intake conduit including an air inlet passage. In one embodiment of the invention, the air intake conduit includes a primary duct including a passage which permits the flow of air through the primary duct. The primary duct is configured so as to be attachable to the fuel metering device permitting fluid communication of air through the primary duct to the fuel metering device. In one embodiment of the invention, the primary duct includes a venturi section.

An air flow directing vane extends across the passage of the primary duct typically at the upstream end of the primary duct and is configured having a relatively narrow cross section which is oriented in relation to the air flow in such a manner that the air flow directing vane presents a leading edge and a trailing edge to the air flow. The air flow directing vane is also configured and oriented to impart a controlled and substantially inclined circular air flow within the air inlet passage.

The preferred embodiment of the invention includes a plurality of air flow directing vanes attached near the upper or upstream end of the primary duct, extending axially from the sides of the primary duct towards the center region of the air inlet passage. A secondary duct, including a venturi, is attached at the second end of each of the plurality of air flow directing vanes, the secondary duct being positioned for fluid communication of air through the secondary duct into the air inlet passage. Means for dispensing liquid fuel in the region of the venturi for atomization in the air flow is provided.

In one embodiment of the invention, the air flow directing vane is configured as an asymmetrical airfoil including a leading edge and trailing edge. The asymmetrical airfoil is configured such that a first side includes both a leading angle and a trailing angle and a surface having a width greater than the width of the second side of the asymmetrical airfoil. In addition, the second side of the asymmetrical airfoil may be configured having a relatively flat surf ace.

This configuration creates an air flow over the first side of the asymmetrical airfoil that has a velocity which is greater than the flow of air across the second side of the asymmetrical airfoil. As the air passing over the first side of the asymmetrical airfoil converges with the flow of air passing across the second side of the asymmetrical airfoil, the air streams merge and are directed in a generally arcuate flow away from the first side of the asymmetrical airfoil and towards the second side of the asymmetrical airfoil. As the air stream progresses through the air intake passage, the air flow is influenced by the inner wall of the air intake conduit causing the air flow to swirl resulting in a controlled, substantially circular and inclined air flow within the air inlet passage. This controlled, substantially circular and inclined air flow within the air inlet passage, is referred to herein as a controlled cyclonic air flow.

In one embodiment of the invention, the leading angle of the air flow lies at an angle between zero degrees (0°) and ten degrees (10°), to the air flow through the primary duct. In the preferred embodiment of the invention, the leading angle of the asymmetrical airfoil lies at an angle substantially equal to five degrees (5°) to the air flow through the primary duct.

In an alternate embodiment of the invention, the air flow directing vane may be twisted about its longitudinal axis which contributes to the formation of a controlled and substantially inclined circular air flow within the air inlet passage.

In still another embodiment of the invention, the controlled and substantially inclined circular air flow may be characterized as a cyclonic air flow, that is, as an air flow which exhibits a relatively lower pressure at the center of the passage with a higher concentration of atomized fuel and air mixture lying at the outer regions of the air flow.

Other advantages will become apparent to those skilled in the art from the following detailed description read in conjunction with the appended claims.

BRIEF DESCRIPTION OF THE DRAWINGS

FIG. 2 is a side cutaway view of an air intake conduit according to one embodiment of the present invention shown attached to a throttle body of a fuel metering device;

FIG. 3 is a cross-sectional representational view of an air flow directing vane configured as an asymmetrical airfoil according to one embodiment of the present invention;

FIG. 4 is a cross-sectional representational view of an air flow directing vane including a twist about its longitudinal axis;

FIG. 5A is a top view of an air intake conduit according to one embodiment of the present invention;

FIG. 5B is a detailed representational view of a leading edge of an air flow directing vane according to one embodiment of the present invention;

FIG. 6A is a bottom view of an air intake conduit according to one embodiment of the present invention; and FIG. 6B is a detailed representational view of a trailing edge according to one embodiment of the present invention; and

DETAILED DESCRIPTION OF THE INVENTION

Figure 1:
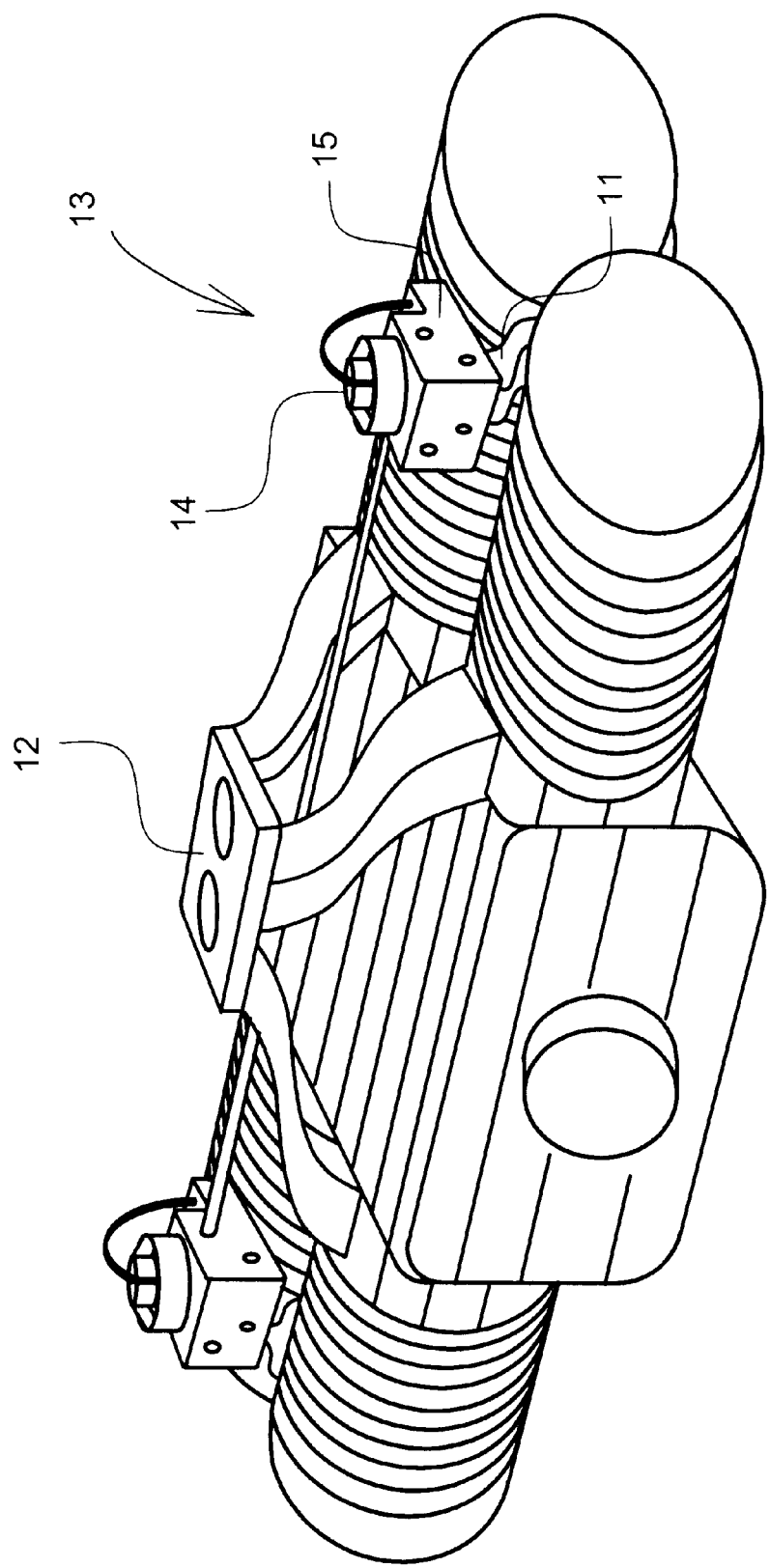
FIG. 1 is a perspective representational view of an engine.

Referring now to the Figures, an improved air intake conduit according to the present invention will be more fully described.

Referring to FIG. 1, engine 10 includes intake manifold 11 and exhaust manifold 12. Fuel metering device, carburetor 13 is shown attached to the intake manifold 11. Carburetor 13 includes carburetor body 15 to which intake conduit 14 is attached.

Referring to FIG. 2, a cross-sectional representational view of intake conduit 14 is shown attached to throttle body 17. Intake conduit 14 includes an air inlet passage, shown generally as 21, which permits air flow A to enter intake conduit 14. Intake conduit 14 includes primary duct 22 having primary duct passage 23 which permits the fluid communication of air and fuel mixture through primary duct 22. Primary duct 22 is attachable to throttle body 17 with primary duct passage 23 fluidly communicating with throttle passage 18. As shown in FIG. 2, primary duct 22 may include primary duct venturi 24.

Generally speaking, primary duct 22 is configured as a cylindrical section having a first end and a second end, the first end being attachable to a fuel metering device, in this case throttle body 17.

Located near the second or upstream end of primary duct 22, are a plurality of air flow directing vanes 30 which extend axially within primary duct 22. Each air flow directing vane 30 includes a first end, a second end and a longitudinal axis. The first end of each air flow directing vane is attached near the upstream end of primary duct 22, and the second end of each air flow directing vane 30 extends towards the center of primary duct passage 23 and attaches to secondary duct 25, supporting and positioning secondary duct 25 substantially in the center of air inlet passage 21. As shown in FIG. 2, each air flow directing vane 30 extends at an incline towards the center of primary duct passage 23 and attaches to secondary duct 25. The inclined leading edge feature of each air flow directing vane 30 reduces drag along the leading edge, thereby reducing turbulence in the flow through primary duct passage 23. Secondary duct 25 defines secondary duct passage 26 which permits air flow A to pass through the center of secondary duct 25. Secondary duct 25 is configured including venturi 27.

Fuel supply line 16 is positioned just above venturi 27 for dispensing fuel within secondary duct 25. As air flow A passes through air inlet passage 21, a portion passes through secondary duct passage 26 drawing fuel from fuel supply line 16, atomizing the liquid fuel for distribution throughout air flow A.

A portion of air flow A passes over air flow directing vanes 30 which impart a controlled and substantially inclined circular element to the movement of air flow A. As controlled and substantially inclined circular air flow C passes through throttle body 17, it encounters throttle valve 19, passing eventually to the intake manifold (not shown).

The design of the present invention has the advantage of permitting a primarily laminar air flow past venturi 27 providing the required velocity to achieve atomization at the end of fuel supply line 16 and throughout the region of venturi 27. The controlled and substantially inclined circular air flow C, created as air flow A is drawn past the plurality of air flow directing vanes 30, provides effective means for presenting a consistent air/fuel mixture to the intake manifold for combustion.

Referring to FIG. 3, a cross-sectional representational view of air flow directing vane 30 is shown. In this embodiment of the invention, air flow directing vane 30 is configured as asymmetrical airfoil 31 having leading edge 32 defined by first angular component 33. Asymmetrical airfoil 31 also includes trailing edge 34 defined by trailing angle 35.

FIG. 4 is a cross-sectional representational view of an alternate embodiment of an air flow directing vane shown generally at 40 configured to include a twist about the longitudinal axis of air flow directing vane 40. Air flow directing vane 40 also includes leading edge 42 and trailing edge 44. Air flow directing vane 40 is shown including a substantially rectangular cross-section 41. Leading edge 42 presents an effective leading angle shown at 43 which is defined by the angle between a first axis of air flow directing vane 40 which lies substantially parallel to air flow A.

Referring to FIG. 5A, a top representational view of intake conduit 14 is shown. Intake conduit 14 includes primary duct 22 having a plurality of air flow directing vanes 30 attached about its upper end and extending axially towards the center of primary duct passage 23. Primary duct 22 as shown in FIG. 5A may also include a primary duct venturi 24. Intake conduit 14 is also shown including secondary duct 25 including venturi 27. As shown in FIG. 5A, secondary duct 25 defines secondary duct passage 26. Fuel supply 16 extends within secondary duct 25 terminating just above venturi 27. Also shown in FIG. 5A is controlled and substantially inclined circular air flow C.

FIG. 5B is a detail of air flow directing vane 30 showing leading edge 32 which is partially defined by lead bevel 36. It should be noted in the embodiment of the invention shown in FIG. 5B that lead bevel 36 incorporates a compound angle having a first angular component 33 (shown in FIG. 3) and a second angular component 38, as shown in FIG. 5B. Second angular component 38 is formed such that the apex of leading edge 32 extends angularly rather than axially from the center of the intake conduit 14.

FIG. 6A is bottom representational view of intake conduit 14, once again including primary duct 22 defining primary duct passage 23 and including primary duct venturi 24 and secondary duct 25 defining secondary duct passage 26 and including venturi 27. As shown, a plurality of air flow directing vanes 30 are attached at a first end to primary duct 22 extending axially within primary duct passage 23 attaching at their second ends to secondary duct 25, supporting secondary duct 25 substantially at the center of primary duct passage 23. Fuel supply line 16 is shown extending across primary duct passage 23 terminating at secondary duct 25. Also shown in FIG. 6A is controlled and substantially inclined circular air flow C.

FIG. 6B is a detail showing air flow directing vane 30 including trailing edge 34 which is partially defined by trailing edge bevel 37. It should be noted that in the embodiment of the invention shown in FIG. 6B trailing edge bevel 37 incorporates a compound angle having a first angular component 35 (shown in FIG. 3) and a second angular component 39, as shown in FIG. 6B. Second angular component 39 is formed such that the apex of trailing edge 34 extends angularly rather than axially from the center of the intake conduit 14. In the embodiment of the invention shown in FIG. 6B, the compound bevel formed at trailing edge bevel 35 taken together with the configuration of leading edge 32, specifically at lead bevel 36, as shown in FIG. 5B, produce a configuration that is effectively twisted about the longitudinal axis of air flow directing vane 30.

While this invention has been described with reference to the described embodiments, this is not meant to be construed in a limiting sense. Various modifications to the described embodiments, as well as additional embodiments of the invention, will be apparent to persons skilled in the art upon reference to this description, the drawings and the appended claims. It is therefore contemplated that the appended claims will cover any such modifications or embodiments as fall within the true scope of the invention.

I claim:

1. An air intake conduit for a fuel metering device including an air inlet passage, the air intake conduit comprising:

a primary duct including a passage, the primary duct attachable to the fuel metering device for fluid communication of air through the primary duct to the fuel metering device; and an air flow directing vane including an asymmetrical airfoil having an inclined leading edge and a trailing edge attached to the fuel metering device, the air flow directing vane extending axially within the passage of the primary duct, the air flow directing vane oriented to impart a controlled cyclonic air flow within the air inlet passage.

2. The air intake conduit of claim 1 wherein the leading angle of the asymmetrical airfoil lies at an angle between 0° and 10° to the air flow through the primary duct.

3. The air intake conduit of claim 1 wherein the leading angle of the asymmetrical airfoil lies at an angle substantially equal to 5° to the air flow through the primary duct.

4. The air intake conduit of claim 1 wherein the air flow directing vane further comprises a twist about the longitudinal axis of the air flow directing vane for imparting a controlled cyclonic air flow within the air inlet passage.

5. An air intake conduit for a fuel metering device including an air inlet passage, the air intake conduit comprising:

a primary duct including a passage, the primary duct attachable to the fuel metering device for fluid communication of air through the primary duct to the fuel metering device;

an air flow directing vane including an asymmetrical airfoil having an inclined leading edge and a trailing edge attached to the fuel metering device, the air flow directing vane extending axially within the passage of the primary duct, the air flow directing vane oriented to impart a controlled cyclonic air flow within the air inlet passage; and a secondary duct including a venturi attached to the second end of the air flow directing vane, the secondary duct positioned for fluid communication of air through the secondary duct to the air inlet passage.

6. The air intake conduit of claim 5 wherein the leading angle of the asymmetrical airfoil lies at an angle between 0° and 10° to the air flow through the primary duct.

7. The air intake conduit of claim 5 wherein the leading angle of the asymmetrical airfoil lies at an angle substantially equal to 5° to the air flow through the primary duct.

8. The air intake conduit of claim 5 wherein the air flow directing vane further comprises a twist about the longitudinal axis of the air flow directing vane for imparting a controlled cyclonic air flow within the air inlet passage.

9. The air intake conduit of claim 6 wherein the air flow directing vane further comprises a twist about the longitudinal axis of the air flow directing vane for imparting a controlled cyclonic air flow within the air inlet passage.

10. An air intake conduit for a fuel metering device including an air inlet passage, the air intake conduit comprising:

a primary duct including a passage and a venturi, the primary duct attachable to the fuel metering device for fluid communication of air through the primary duct to the fuel metering device;

a plurality of air flow directing vanes, each air flow directing vane including an asymmetrical airfoil having a first end, a second end, a longitudinal axis, having an inclined leading edge and a trailing edge, the first end of each of the plurality of air flow directing vanes attached to the fuel metering device and the second end of each air flow directing vane extending axially within the primary duct passage, each of the plurality of air flow directing vanes oriented to impart a controlled cyclonic air flow within the air inlet passage; and a secondary duct including a venturi attached to the second end of each of the plurality of air flow directing vanes, the secondary duct positioned for fluid communication of air through the secondary duct to the air inlet passage.

11. The air intake conduit of claim 10 wherein the leading angle of each asymmetrical airfoil lies at an angle between 0° and 10° to the air flow through the primary duct.

12. The air intake conduit of claim 10 wherein the leading angle of each asymmetrical airfoil lies at an angle substantially equal to 5° to the air flow through the primary duct.

13. The air intake conduit of claim 10 wherein the air flow directing vane further comprises a twist about the longitudinal axis of the air flow directing vane for imparting a controlled cyclonic air flow within the air inlet passage.

14. The air intake conduit of claim 10 wherein the air flow directing vane further comprises a twist about the longitudinal axis of the air flow directing vane for imparting a controlled cyclonic air flow within the air inlet passage.

* * * * *